(12) United States Patent
Cook et al.

(10) Patent No.: US 9,634,730 B2
(45) Date of Patent: Apr. 25, 2017

(54) WIRELESS ENERGY TRANSFER USING COUPLED ANTENNAS

(75) Inventors: Nigel P. Cook, El Caion, CA (US); Paul Meier, Hamilton (NZ); Lukas Sieber, Olten (CH); Marc Secall, Fribourg (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 11/775,168

(22) Filed: Jul. 9, 2007

(65) Prior Publication Data

US 2009/0015075 A1    Jan. 15, 2009

(51) Int. Cl.
*H01Q 11/12* (2006.01)
*H04B 5/00* (2006.01)
*H02J 5/00* (2016.01)

(52) U.S. Cl.
CPC ............ *H04B 5/0037* (2013.01); *H02J 5/005* (2013.01); *H04B 5/0081* (2013.01)

(58) Field of Classification Search
CPC ...... H04B 5/0037; H04B 5/0081; H02J 5/005
USPC .... 343/742, 866, 867, 842; 340/572.7, 10.1; 307/104; 455/41.4
See application file for complete search history.

(56) References Cited

U.S. PATENT DOCUMENTS

| | | | | |
|---|---|---|---|---|
| 2,266,262 A | * | 12/1941 | Polydoroff | 343/764 |
| 5,565,846 A | * | 10/1996 | Geiszler et al. | 340/572.2 |
| 5,826,178 A | * | 10/1998 | Owen | 455/193.1 |
| 5,955,950 A | * | 9/1999 | Gallagher et al. | 340/572.1 |
| 6,072,383 A | * | 6/2000 | Gallagher et al. | 340/10.2 |
| 6,356,197 B1 | * | 3/2002 | Patterson et al. | 340/572.1 |
| 6,547,149 B1 | | 4/2003 | Wuidart et al. | |
| 7,541,930 B2 | * | 6/2009 | Saarisalo et al. | 340/572.7 |
| 7,741,734 B2 | | 6/2010 | Joannopoulos et al. | |
| 7,825,543 B2 | | 11/2010 | Karalis et al. | |
| 2004/0037363 A1 | | 2/2004 | Norsworthy et al. | |
| 2005/0127867 A1 | | 6/2005 | Calhoon et al. | 320/108 |
| 2005/0131495 A1 | | 6/2005 | Parramon et al. | 607/61 |
| 2007/0222542 A1 | | 9/2007 | Joannopoulos | |
| 2008/0191897 A1 | | 8/2008 | McCollough | 340/625.22 |
| 2008/0266748 A1 | * | 10/2008 | Lee | 361/270 |
| 2011/0012431 A1 | | 1/2011 | Karalis et al. | |
| 2011/0049978 A1 | | 3/2011 | Sasaki et al. | |

FOREIGN PATENT DOCUMENTS

| | | |
|---|---|---|
| CN | 1653670 A | 8/2005 |
| JP | 2000504421 A | 4/2000 |
| JP | 2000341884 A | 12/2000 |
| JP | 2002508916 A | 3/2002 |

(Continued)

OTHER PUBLICATIONS

"Wireless Non-Radiative Energy Transfer", MIT paper, publication and date unknown, believed to be 2007.

(Continued)

*Primary Examiner* — Hoanganh Le
(74) *Attorney, Agent, or Firm* — Knobbe Martens Olson & Bear LLP

(57) ABSTRACT

A power transmission system produces a magnetic field at a source that is wirelessly coupled to a receiver. Both the source and receiver are capacitively coupled LC circuits, driven at or near resonance.

68 Claims, 9 Drawing Sheets

(56) References Cited

FOREIGN PATENT DOCUMENTS

| JP | 2004135135 A | 4/2004 |
|---|---|---|
| JP | 2008508842 A | 3/2008 |
| WO | WO03098773 A1 | 11/2003 |
| WO | WO2006011769 A1 | 2/2006 |
| WO | WO2007008646 A2 | 1/2007 |

OTHER PUBLICATIONS

"Efficient wireless non-radiative mid-range energy transfer", MITpaper, publication and date unknown, believed to be 2007.
"Wireless Power Transfer via Strongly Coupled Magnetic Resonances", Kurs et al, Science Express, Jun. 7, 2007.
"Wireless Power Transfer via Strongly Coupled Magnetic Resonances", Kurs et al, scimag.org, Jul. 6, 2007.
International Search Report—PCT/US2008/069468—International Search Authority, European Patent Office, Nov. 28, 2008.
Written Opinion—PCT/US2008/069468, International Search Authority, European Patent Office, Nov. 28, 2008.
Supplementary European Search Report—EP08772464, Search Authority—The Hague, Jan. 7, 2014.

\* cited by examiner

| APPROXIMATE DISTANCE [INCH] | APPROXIMATE POWER [W] | |
|---:|---:|---|
| 39 | 0.006 | |
| 35.5 | 0.008 | |
| 31.5 | 0.013 | |
| 27.5 | 0.022 | |
| 23.5 | 0.050 | |
| 20 | 0.100 | USABLE RANGE |
| 16 | 0.350 | |
| 12 | 0.790 | |
| 10 | 1.260 | |
| 8 | 1.258 | |
| 6 | 1.000 | |
| 4 | 0.560 | |

WIRELESS ENERGY TRANSFER USING COUPLED ANTENNAS

BACKGROUND

It is desirable to transfer electrical energy from a source to a destination without the use of wires to guide the electromagnetic fields. This wireless transfer of energy has been attempted historically by many electromagnetic field experts—most notably Nikola Tesla in the early 20th century. A difficulty of these previous attempts has been low efficiency together with an inadequate amount of power delivered.

SUMMARY

The present application teaches a wireless electrical energy transfer, and teaches specific techniques for that energy transfer.

Aspects describe the specific antennas, and specific types of coupling between the transmitter and receiver.

BRIEF DESCRIPTION OF THE DRAWINGS

These and other aspects will now be described in detail with reference to the accompanying drawings, wherein.

DETAILED DESCRIPTION

The present application describes transfer of energy from a power source to a power destination via electromagnetic field coupling. Embodiments describe techniques for new coupling structures, e.g., transmitting and receiving antennas.

A preferred embodiment is shown in which the main coupling occurs via inductive coupling, using primarily a magnetic field component. In the embodiment shown in FIG. 1, for example, energy is formed as a stationary magnetic wave in the area of the transmitting antenna. The energy that is produced is at least partly a non-radiative, stationary magnetic field. The produced field is not entirely magnetic, nor entirely stationary, however at least a portion is. Unlike a traveling electromagnetic wave, which would continue propagating into space and have its energy wasted, at least a portion of the stationary magnetic wave remains in the area of the transmitting antenna and is rendered usable by the disclosed techniques.

Other embodiments may use similar principles of the embodiments are equally applicable to primarily electrostatic and/or electrodynamic field coupling as well. In general, an electric field can be used in place of the magnetic field, as the primary coupling mechanism.

One aspect of the embodiment is the use of a high efficiency via increasing the so-called Q factor of the coupling structures (primarily the antennas) at the self-resonant frequency used for the sinusoidal waveform of the electromagnetic field, voltage or current used. We have discovered that the efficiency and amount of power is superior for a system which uses a single, substantially un-modulated sine wave. In particular, the performance is superior to a wideband system which attempts to capture the power contained in a wideband waveform or in a plurality of distinct sinusoidal waveforms of different frequencies. Other embodiments may use less pure waveforms, in recognition of the real-world characteristics of the materials that are used.

Techniques are described herein which enable small resonant antennas with relatively high Q factors. The Q of a resonant device is the ratio of the resonant frequency to the so-called "three dB" or "half power" bandwidth of the resonant device. While there are several "definitions," all are substantially equivalent to each other, to describe Q in terms of measurements or the values of resonant circuit elements.

Figure 1:
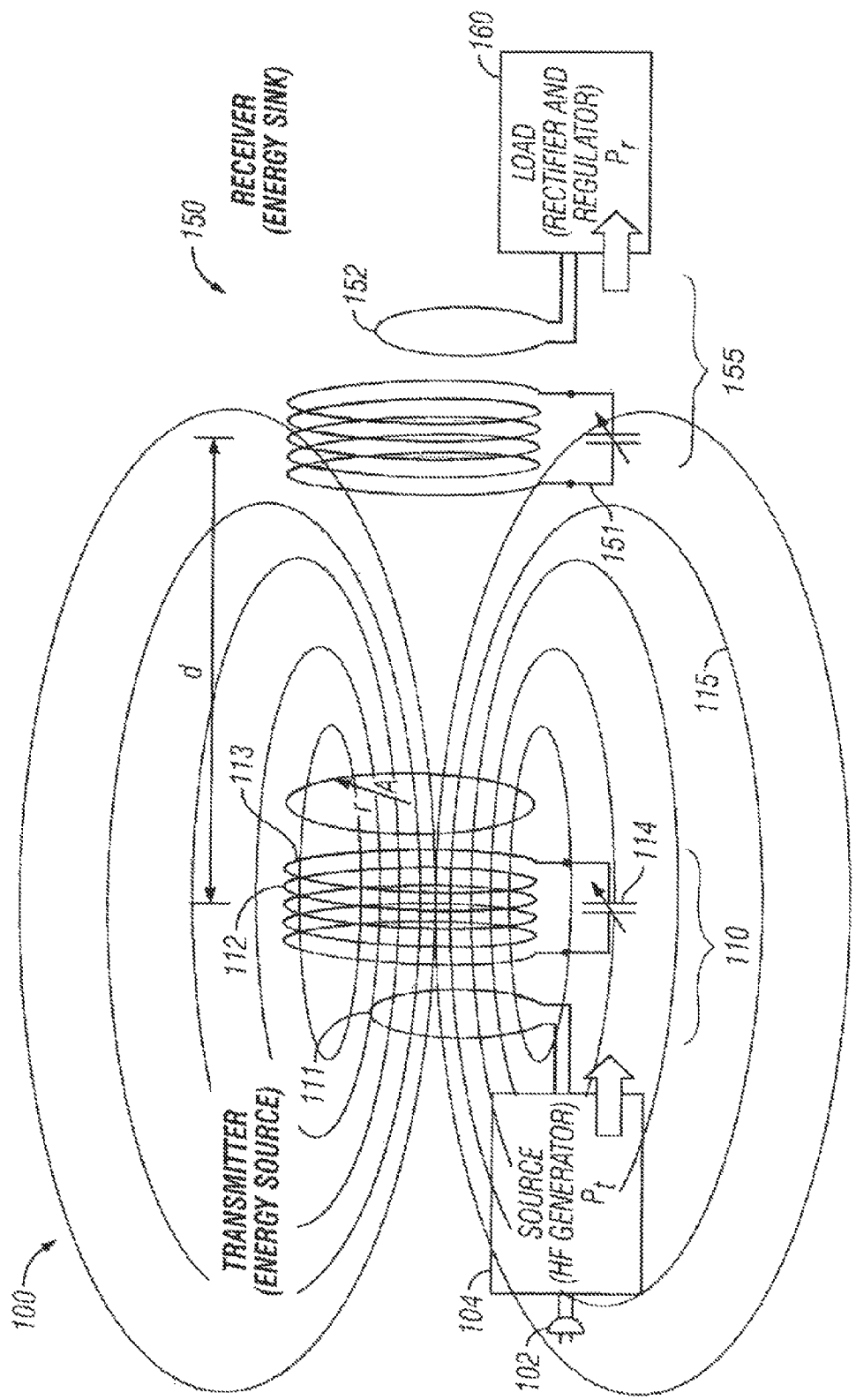
FIG. 1 shows a block diagram of a magnetic wave based wireless power transmission system.

A basic embodiment is shown in FIG. 1. A power transmitter assembly 100 receives power from a source, for example, an AC plug 102. A frequency generator 104 is used to couple the energy to an antenna 110, here a resonant antenna. The antenna 110 includes an inductive loop 111, which is inductively coupled to a high Q resonant antenna part 112. The resonant antenna includes a number N of coil loops 113 each loop having a radius $R_A$. A capacitor 114, here shown as a variable capacitor, is in series with the coil 113, forming a resonant loop. In the embodiment, the capacitor is a totally separate structure from the coil, but in certain embodiments, the self capacitance of the wire of forming the coil can form the capacitance 114.

The frequency generator 104 can be preferably tuned to the antenna 110, and also selected for FCC compliance.

This embodiment uses a multidirectional antenna. 115 shows the energy as output in all directions. The antenna 100 is non-radiative, in the sense that much of the output of the antenna is not electromagnetic radiating energy, but is rather a magnetic field which is more stationary. Of course, part of the output from the antenna will in fact radiate.

Another embodiment may use a radiative antenna.

A receiver 150 includes a receiving antenna 155 placed a distance d away from the transmitting antenna 110. The receiving antenna is similarly a high Q resonant coil antenna 151 having a coil part and capacitor, coupled to an inductive coupling loop 152. The output of the coupling loop 152 is rectified in a rectifier 160, and applied to a load. That load can be any type of load, for example a resistive load such as a light bulb, or an electronic device load such as an electrical appliance, a computer, a rechargeable battery, a music player or an automobile.

The energy can be transferred through either electrical field coupling or magnetic field coupling, although magnetic field coupling is predominantly described herein as an embodiment.

Electrical field coupling provides an inductively loaded electrical diode that is an open capacitor or dielectric disk. Extraneous objects may provide a relatively strong influence on electric field coupling.

Magnetic field coupling may be preferred, since it has a weak influence on any extraneous objects and many extraneous objects have the same magnetic properties as "empty" space.

The embodiment describes a magnetic field coupling using a capacitively loaded magnetic dipole. Such a dipole is formed of a wire loop forming at least one loop or turn of a coil, in series with a capacitor that electrically loads the antenna into a resonant state.

Figure 2:
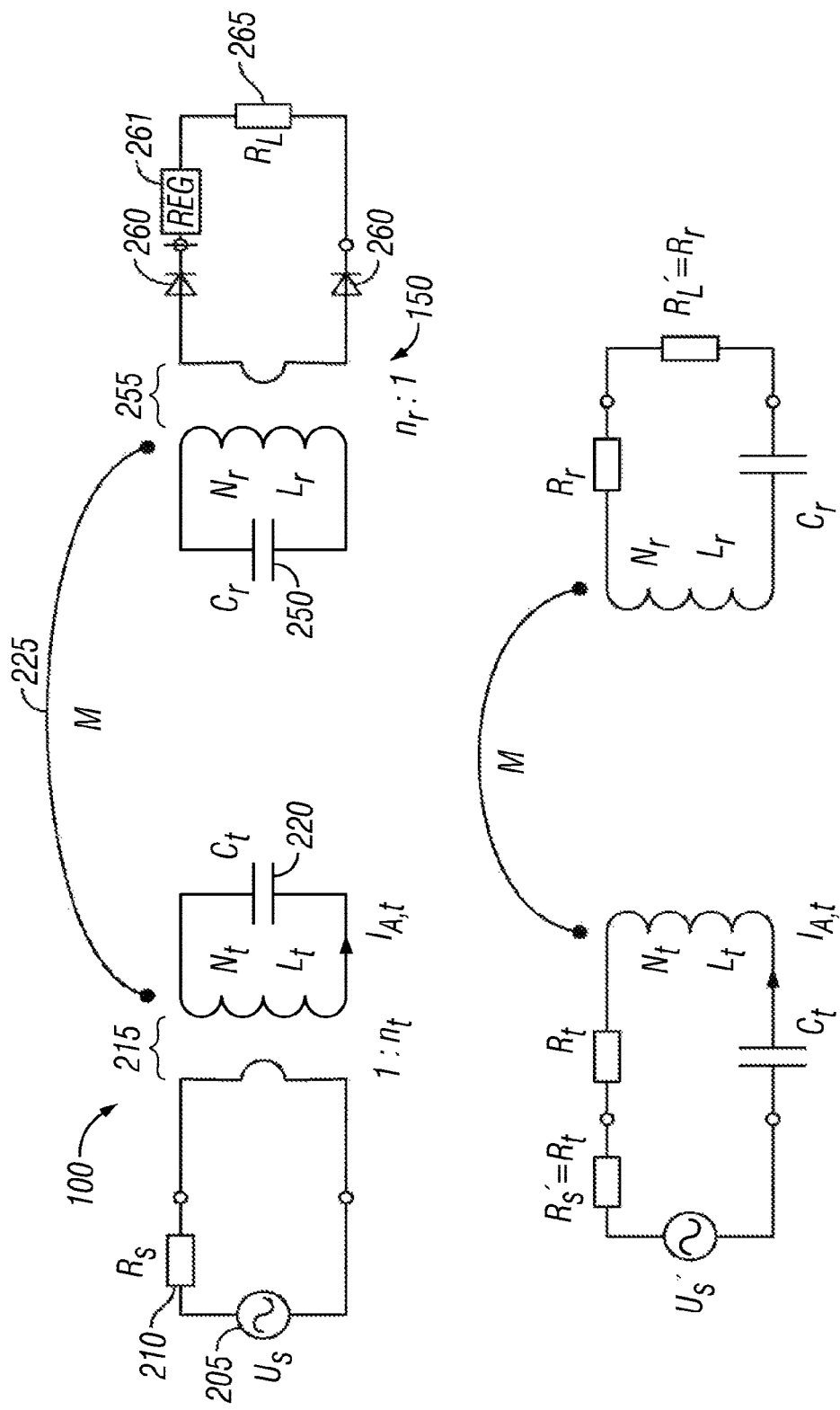
FIG. 2 shows circuit diagrams of the circuits in the FIG. 1 diagram.

FIG. 2 shows equivalent circuits for the energy transfer. The transmit circuit 100 is a series resonant circuit with RLC portions that resonate at the frequency of the high frequency generator 205. The transmitter includes a series resistance 210, and inductive transformer coil 215, and the variable capacitance 220. This produces the magnetic field coupling M 225.

The signal generator 205 has an internal resistance 210 that is preferably matched to the transmit resonator's resistance at resonance by the inductive loop. This allows transferring maximum power from the transmitter to the receiver antenna.

The receive portion 150 correspondingly includes a capacitor 250, inductive transformer coil 255, rectifier 260, and regulator 261, to provide a regulated output voltage. The output is connected to a load resistance 265. FIG. 2 sketches a rectifier, but it should be understood that more complex rectifier circuits can be used. The impedance of the rectifier 260 and regulator 261 is matched to the resistance of the receive resonator at resonance. This enables transferring a maximum amount of power to the load. The resistances $R_t$ and $R_r$, take into account skin effect/proximity effect, radiation resistance, as well as both internal and external dielectric loss.

A perfect resonant transmitter will ignore, or minimally react with, all other nearby resonant objects having a different resonant frequency. However, when a receiver that has the proper resonant frequency encounters the field of the transmitting antenna 225, the two couple in order to establish a strong energy link. In effect, the transmitter and receiver operate to become a loosely coupled transformer.

The inventors have discovered a number of factors that improve the transfer of power from transmitter to receiver.

Q factor of the circuits, described above, can assist with certain efficiencies. A high Q factor allows increased values of current at the resonant frequency. This enables maintaining the transmission over a relatively low wattage. In an embodiment, the transmitter Q may be 1400, while the receiver Q is around 300. For reasons set forth herein, in one embodiment, the receiver Q may be much lower than the transmitter Q, for example ¼ to ⅕ of the transmitter Q. However, other Q factors may be used.

High Q has a corresponding disadvantage of narrow bandwidth effects. Such narrow bandwidth have typically been considered as undesirable for data communications. However, the narrow bandwidth can be used in power transfer. When a high Q is used, the transmitter signal is sufficiently pure and free of undesired frequency or phase modulation to allow transmission of most of its power over this narrow bandwidth.

For example, an embodiment may use a resonant frequency of 13.56 MHz and a bandwidth of around 9 kHz. This is highly usable for a substantially un-modulated fundamental frequency. Some modulation on the fundamental frequency may be tolerated or tolerable, however, especially if other factors are used to increase the efficiency. Other embodiments use lower Q components, and may allow correspondingly more modulation on the fundamental.

An important feature may include use of a frequency which is permitted by regulation, such as FCC regulations. The preferred frequency in this exemplary embodiment is 13.56 MHz but other frequencies may be used as well.

In addition, the capacitors should be able to withstand high voltages, for example as high as 1000 V, since the resistance may be small in relation to the capacitive reactance. A final important feature is the packaging: the system should be in a small form factor. The Q factor can be expressed as:

$$Q = \frac{1}{R} \cdot \sqrt{\frac{L}{C}}$$

$$C = C_{self} + C_{ed}$$

$$R = R_{rad} + R_{loss}$$

Where:

The value L represents the inductance of the resonator. This inductance is given by the geometry of the resonator and its antenna.

The value C represents capacitance, including an inherent (self) capacitance which stores energy in the electric field. Both the self capacitance of the inductor, as well as an external capacitor form part of the total capacitance.

The value R represents the resistance of the resonator, formed by the coil resistance of the inductor, and the radiation resistance. These collectively lower the Q of the resonator as R increases.

All of these values together form the Q or quality factor of the resonator. Q represents in general how well the resonator generates and receives magnetic energy. By keeping C and R low, the L of the coil may be the most predominant factor.

It is desirable to increase the Q as much as possible in an embodiment. Accordingly, certain values should be considered.

As previously described, high resistance brings down the Q, since the Q is inversely proportional to R. R has two parts, the radiation resistance, as well as an ohmic loss process.

For a N-turn loop antenna, the radiation resistance approximately equals $$R_{rad} = 320 \cdot \pi^4 \left( \frac{\pi \cdot r_A^2}{\lambda^2} \right)^2 \cdot N^2$$

where $r_A$ represents the radius of the coil, and lambda the wavelength.

Therefore, the radiation is dependent on frequency to the fourth power, radius to the fourth power, and the number of turns squared.

Loss resistance can be approximately evaluated as $$R_{loss} = \frac{N}{2 \cdot b} \cdot \sqrt{\frac{f \cdot \mu_0}{\sigma \cdot \pi}} \cdot 2 \cdot \pi \cdot r_A \cdot (1 + \alpha)$$

Note that this is dependent on the square root of frequency, the wire dimensions and material, and the so-called proximity effect.

The self capacitance of a coil in air can be approximately evaluated as:

$$C_{eC_{tt}} = \frac{2 \cdot \pi^2 \cdot b \cdot \varepsilon_0}{\ln\left(\frac{p}{2 \cdot b} + \sqrt{\left(\frac{p}{2 \cdot b}\right)^2 - 1}\right)}$$

$$C_{self} = \frac{C_{tt}}{N - 1}$$

Note that this is also dependent on the physical dimensions of the wires (Radius b), as well as the number of turns N, and the winding pitch p.

For the external plate capacitor, the capacitance is approximately equal to $$C_{ext} = \frac{\varepsilon_0 \cdot \varepsilon_r \cdot A}{d}$$

which is dependent on the area of the plates A, as well as the distance d between the two plates.

Finally, the inductance of a coil in air can be approximately evaluated as $$L = \frac{\mu_0 \cdot \pi \cdot N^2 \cdot r_A^2}{0.9 \cdot r_A + l_A}$$

which is dependent on number of turns N squared and coil radius $r_A^2$.

As explained above, the high Q may create high voltages, e.g., up to 5 kV. These reactive voltages may be evaluated according to:

$$U_{L,C} = Q\sqrt{P \cdot R}$$

where P and R denote the real input power and R the loss resistance.

An important feature of an embodiment is based on the relationship between the power source, e.g., the transmitter, and the load, e.g. the receiver. The efficiency of the coupling between source and load is based on the Q factors of the circuits, mechanical characteristics of the circuits (mostly, wire sizing), and the distance therebetween.

For an efficiency p less than 0.3, the efficiency can theoretically be expressed as $$\eta(d) \cong \frac{r_{A,t}^2 \cdot r_{A,r}^2 \cdot Q_t \cdot Q_r \cdot K_r \cdot K_t}{16 d^6}$$

Note that this is proportional to the $Q^2$, inversely proportional to the sixth power of distance, and positively proportional to the radius.

Figure 3:
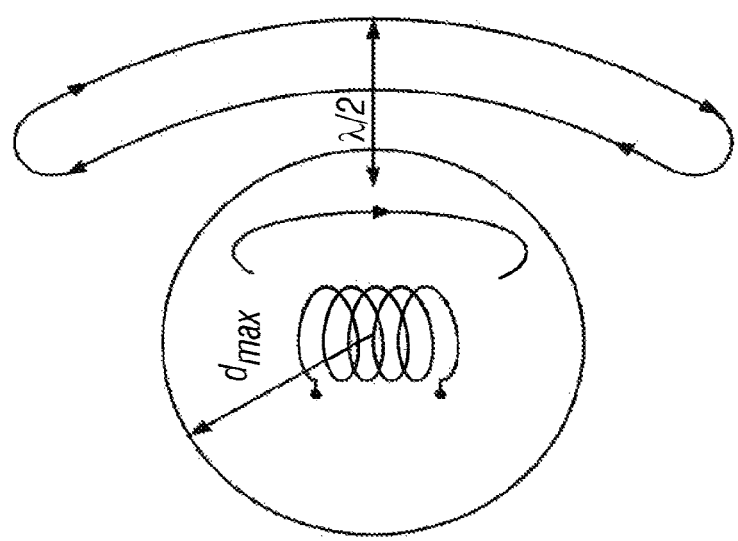
FIG. 3 illustrates an exemplary near field condition plot.
Figure 3:
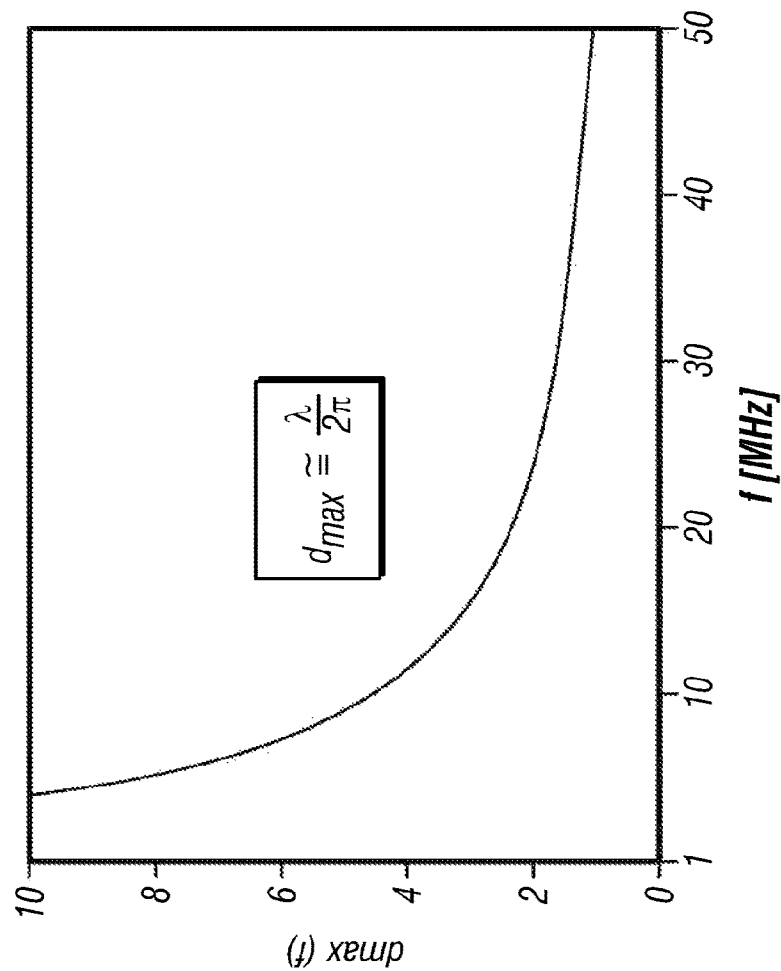

For energy transfer in the near field, a special kind of analysis must be considered. The inventors found that usable power can be harvested from the stationary wave that is set up in the near field of an RF coil. For purposes of this embodiment, the near field is considered to be λ/2 for the frequency of interest. FIG. 3 illustrates how the near field for 13.56 MHz extends approximately 3.5 m from the center of the transmit antenna.

Another constraint may be imposed by regulatory radiation exposure limits.

At the 13.56 MHz frequency, the magnetic field strength must be kept below 60 dBuA/m. Another objective, therefore, requires maintaining this value or less at 10 m.

Another important issue is attributable to the specific antenna type.

Figure 4:
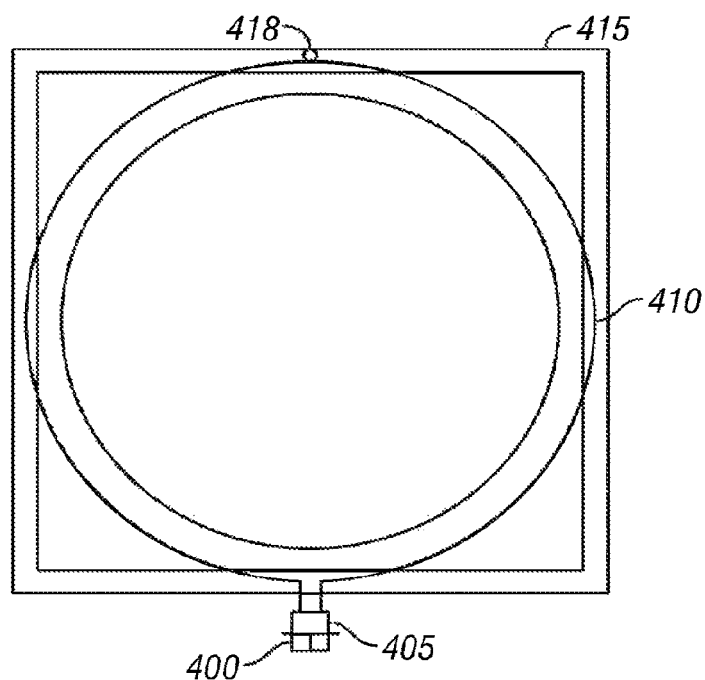
FIGS. 4-8 sketch exemplary transmit antennas.

FIG. 4 illustrates a first embodiment that uses a circular loop on a wooden frame. The loop is connected to a capacitor 400, which may be a variable capacitor with a varying part 405, in series with the main loop 410. This may be formed of one or several loops of wire, preferably, coaxially wound. The coil is mounted to a wooden frame 415, by mount devices 418.

This antenna was demonstrated to have a Q of around 90 at 3 MHz. It has high losses due to its small copper surface.

Figure 5:
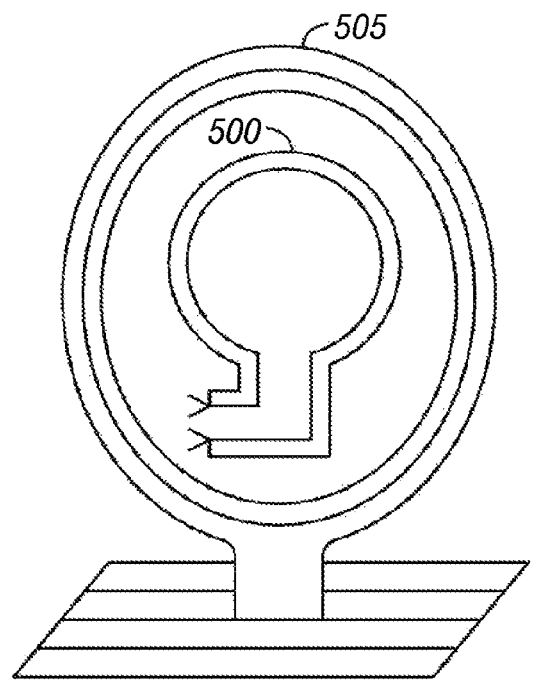

FIG. 5 illustrates a solenoid antenna which can operate between 9 and 15 MHz, and has been demonstrated to have a Q of 1300. The Q may be greatly increased, for example up to 2200, if suspended in air via insulating strings away from solid objects. The loop portion of this antenna 500 induces power into the solenoid portion 505. The solenoid antenna of FIG. 5 may produce the best performance in certain circumstances.

Figure 6:
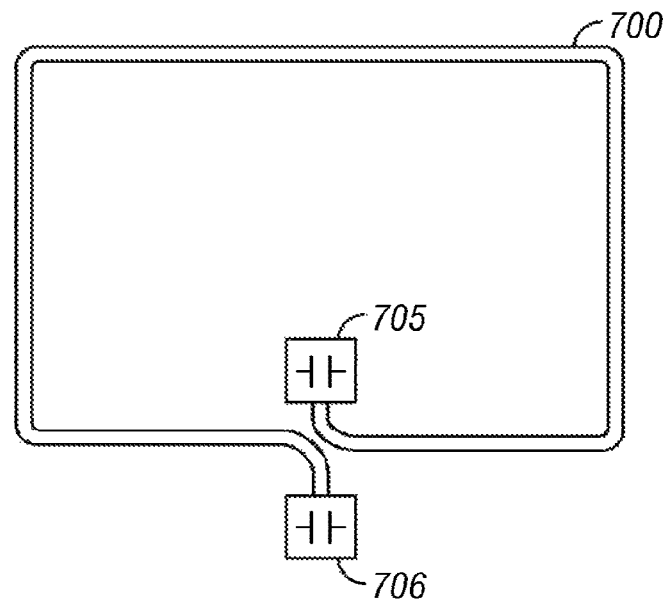

A rectangular loop antenna is shown in FIG. 6. This antenna is formed of a loop portion 700, capacitive portions 705, 706, which may be variable capacitors. This antenna has a Q of about 700, over its tunable range of 12 to 14 MHz. Note that both the inducing part and the regular loop are substantially coplanar, and hence that this form factor is usable in a laptop computer, for example.

Figure 7:
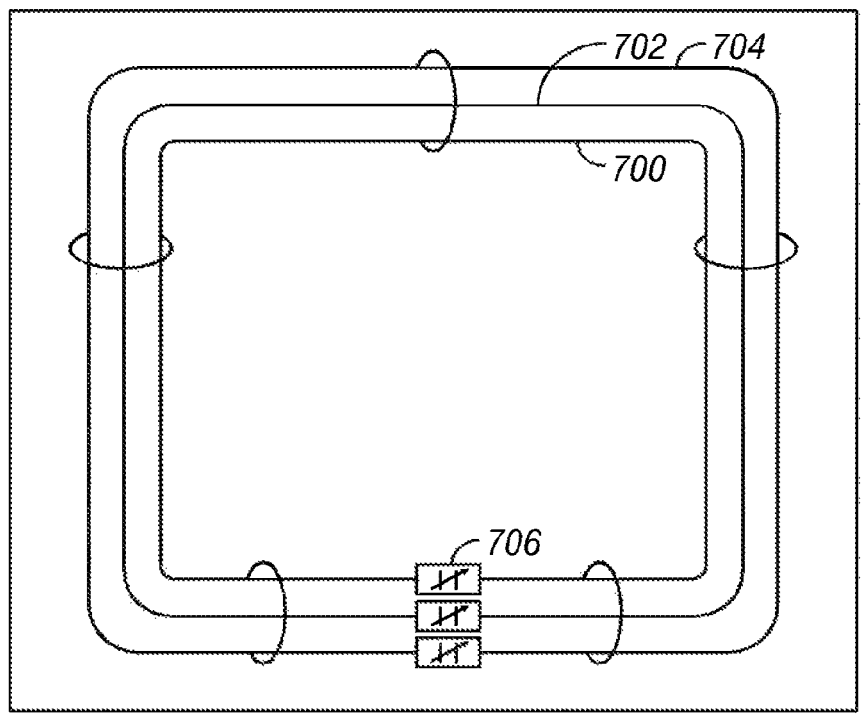

FIG. 7 illustrates a shielded flat-panel antenna, formed by a number of separate loops 700, 702, 704 all held together. Each loop 700 has a corresponding variable capacitor 706. This antenna produced a Q of about 100 between 8 and 10 MHz. While it may have a low L/C ratio due to the capacitance of the coax cable, it has other packaging advantages.

Figure 8:
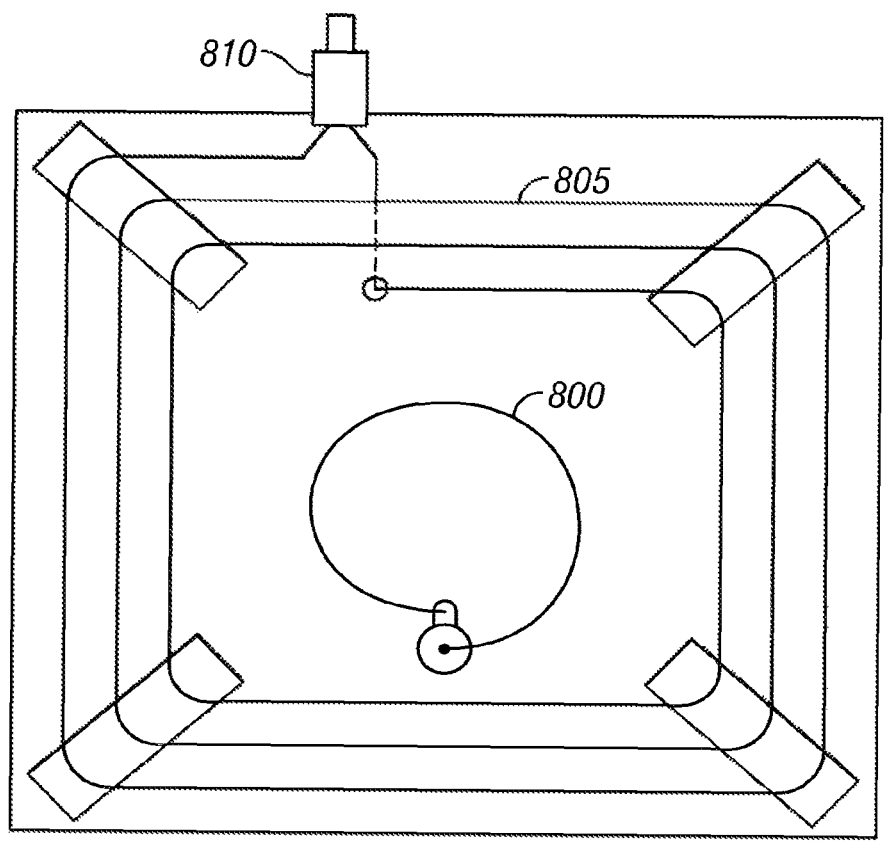

An unshielded flatbed antenna is shown in FIG. 8 comprising the inductive loop 800, and the flat-panel antenna formed of a loop 805, in series with capacitor 810. This has a Q of about 450, and is tunable between around 9 and 15 MHz.

Based on all of these tests and experiments, applicants have concluded that wireless power coupling using antennas of this type allows a transfer efficiency of 10% or greater for short range application, less than 2 m. At the same time, the transferable power under the legal exposure constraints is less than 5 W. For a given Q factor, the transfer efficiency becomes independent of frequency. However, there may be an optimum frequency for each antenna form factor.

Figure 9:
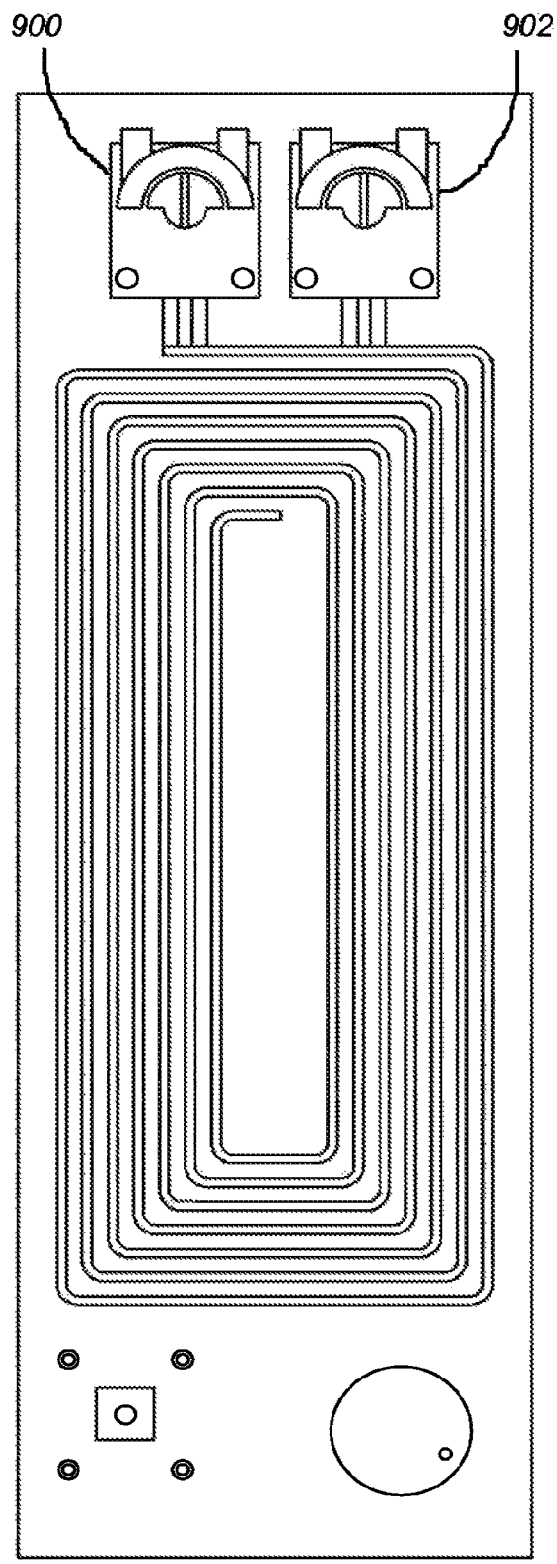
FIG. 9 shows the layout of an exemplary receiving antenna.

An embodiment showing a receive antenna is shown in FIG. 9. It is a very small manually tunable antenna on a 40×90 mm flat panel. The antenna has multiple coils of wires, in series with two variable capacitors 900, 902. Other analogous sizes may also be used—for example, another embodiment describes a small antenna of 60×100 mm, flat-panel, manually tunable. Yet another is a medium antenna 120×200 mm, flat-panel, manually tunable. A large antenna is 240×310 mm, also manually tunable.

Figure 10A:
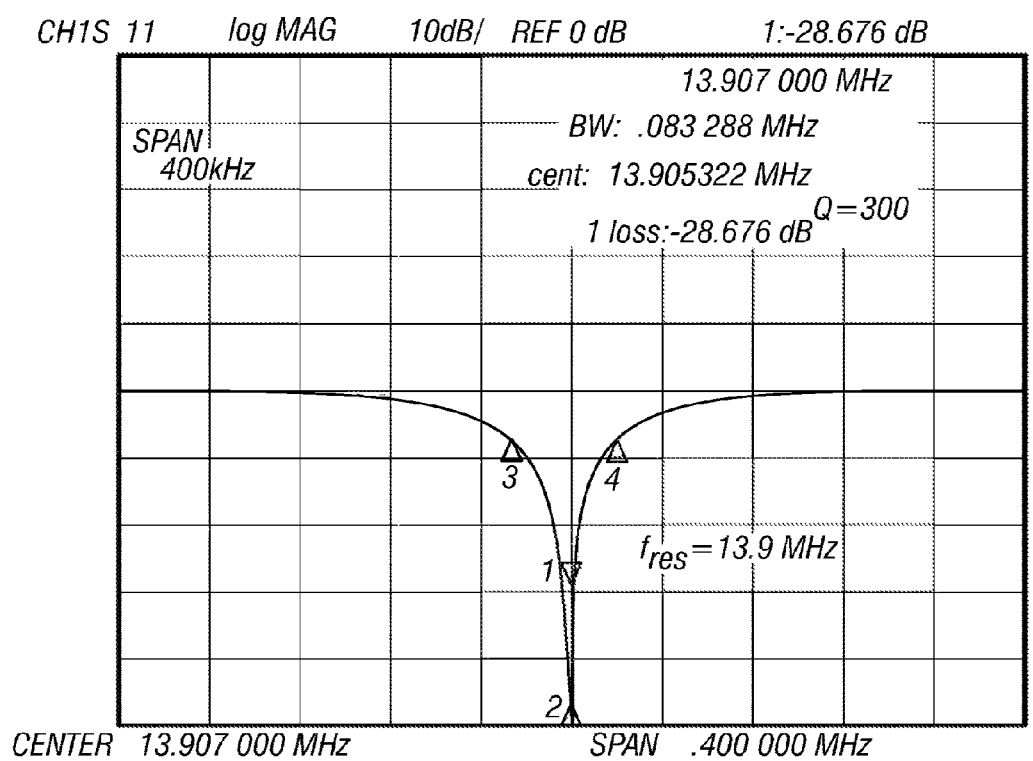
FIGS. 10A-10C illustrate data plots of that receiving antenna.
Figures 10B, 10C:
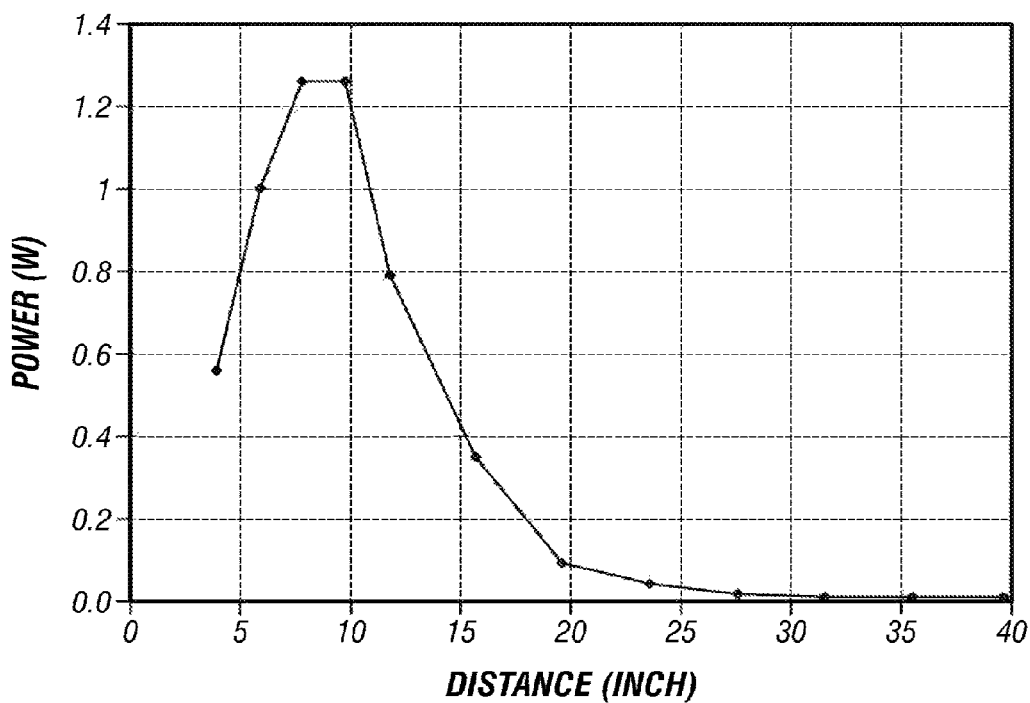

FIGS. 10A-10C illustrates graphically the actual results for use with the FIG. 9 antenna. FIG. 10A illustrates the measured resonance frequency of 13.9 MHz. FIG. 10B illustrates how this antenna has a 3 dB point (50% of maximum transferable power) at about 1 foot. Note, unexpectedly, however, that below 10 inches, the received power value goes down, not up. This is because the receiving antenna, being in the near field of the transmitting antenna actually interacts with the transmitting antenna field by detuning the transmitter. An important feature, therefore, is to maintain this detuning within a determinate limit and design the system intending to maintain the distance between and transmitter and receiver far enough apart so that the antenna can avoid or minimize undesired de-tuning. However, the antenna systems are intentionally allowed to have both maximum and minimum usable distances. FIG. 10C shows a chart with values, thereby illustrating the usable range within which these exemplary antennas can be used. Here that distance range is between approximately 0.15 to 0.2 m (6-8 inches) and 0.5 m (20 inches). However, with other antenna pairs, the minimum distance may be as low as 0.05 m (2 inches), or as high as 0.3 m (12 inches).

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, where a variable capacitor is mentioned, a fixed capacitor may be substituted.

The preferred implementation described here utilizes a single, dipole series resonant antenna for the sake of simplicity, but in general an array of multiple antennas may be used to shape or direct most of the electromagnetic power in the wave towards the receive antenna and not towards "empty" space.

Methods for control of directionality via adjustment of sinusoidal wave phase and amplitude in each antenna is well known to those skilled in the other embodiments may optionally make use of the completely different process that we call "sniffing" to determine where the receiver is located before transmitting full power to it. Before full power flow is established, we turn on the transmitter for limited time intervals to scan the space surrounding the transmitter by means of directive beam for the purpose of determining the presence and location of a receiver, if any.

Furthermore, when comparing the techniques of generating an intentionally partially evanescent wave vs. the technique of generating a partially non-evanescent wave, in many configurations there may be little practical difference between the two results. Partly because portions of near field are evanescent even when the design intent is to produce a non-evanescent wave. Therefore, the mere presence of evanescent waves in a portion of the space near the transmit antenna is a historically well-known phenomenon and does not imply that we are utilizing the properties of evanescent waves in any particular way.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, Java, Brew or any other programming language. The programs may be resident on a storage medium, e.g., magnetic or optical, the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method of transmitting power via a wireless field, comprising:
    driving a multidirectional antenna of a transmitter with a driving signal at a frequency within a range of a resonant frequency of the antenna to produce a magnetic field in more than one direction, the magnetic field configured to wirelessly transfer power to a receiver for charging a load coupled to the receiver, the receiver having a receive loop, the antenna located at a minimum distance from the receive loop of the receiver and having a higher Q factor than the receiver, the minimum distance defining a distance at or above which detuning of the antenna by the receiver is reduced, the antenna including at least a resonant component including a wire loop in series with a capacitor, and an inductive component including an inductive loop; and
    preventing the antenna from being located at less than the minimum distance from the receiver.

2. A method as in claim 1, further comprising receiving power via the magnetic field with a receiving antenna, the receiving antenna including a second resonant component, generating electrical power from the receiving antenna, and coupling the electrical power to a load.

3. A method as in claim 1, wherein the minimum distance is between 2 and 12 inches.

4. A method as in claim 1, further comprising setting the resonant frequency to a value of approximately 13.56 MHz.

5. A method as in claim 1, wherein the antenna has a Q value of at least 1400.

6. A method as in claim 1, wherein the capacitor is capable of withstanding at least 1000 V.

7. A method as in claim 1, wherein driving the antenna comprises driving the antenna with a signal generator and adjusting a resistance of the antenna based on the impedance of the signal generator at resonance to maximize the amount of power transferred from the antenna to the receiver.

8. A method as in claim 1, wherein the antenna has a substantially round outer form factor.

9. A method as in claim 1, wherein the antenna has a substantially rectangular outer form factor.

10. A method as in claim 1, wherein the inductive component is configure to receive a driving signal and is physically separated from the resonant component.

11. A method as in claim 1, wherein the inductive component and the resonant component have different outer form factors.

12. A method as in claim 1, wherein the inductive component and the resonant component have substantially the same outer form factors.

13. A method as in claim 1, wherein the capacitor is a variable capacitor.

14. The method of claim 1, wherein the antenna has a Q value of approximately 700.

15. The method of claim 1, wherein the antenna has a Q value of approximately 450.

16. The method of claim 1, wherein the antenna has a Q value of approximately 100.

17. The method of claim 1, wherein the antenna is located at a maximum distance from the receiver, wherein at a second distance greater than the maximum distance a power received by the receiver falls below a usable range.

18. A method of transferring power via a wireless field, comprising:
  generating a magnetic field in more than one direction using a resonant transmitter having a multidirectional antenna;
  receiving power via the magnetic field with a resonant receiver, the resonant receiver located at a minimum distance from the resonant transmitter and having a lower Q factor than the resonant transmitter, the minimum distance defining a distance at or above which detuning of the resonant transmitter and resonant receiver are reduced, each of the resonant transmitter and the resonant receiver having a resonant component including a wire loop in series with a capacitor, and an inductive component including an inductive loop;
  converting power received by the resonant receiver to electrical power for charging a load coupled to the receiver; and
  preventing at least one of the resonant transmitter or the resonant receiver from being located at less than the minimum distance from the other of the resonant transmitter and resonant receiver.

19. An apparatus for transmitting power via a wireless field comprising:
  a multidirectional antenna having a usable range at a resonant frequency; and
  a power source coupled to the antenna, the power source configured to drive the antenna using a driving signal at a frequency within a range of the resonant frequency to generate a magnetic field in more than one direction, the magnetic field configured to wirelessly transfer power to a receiver for charging a load coupled to the receiver, the receiver having a receive loop, the antenna including at least a resonant component including a wire loop in series with a capacitor, and an inductive component including an inductive loop, the antenna positioned at or further than a minimum distance from the receive loop of the receiver and having a higher Q factor than the receiver, the minimum distance equal to a distance at or above which detuning of the antenna by the receiver is reduced.

20. An apparatus as in claim 19, wherein the receiver includes a rectifier configured to output electrical power to the load coupled to the receiver.

21. An apparatus as in claim 19, wherein the minimum distance is between 2 and 12 inches.

22. An apparatus as in claim 19, wherein the resonant frequency is set to a value of approximately 13.56 MHz.

23. An apparatus as in claim 19, wherein the antenna has a Q value of at least 1400.

24. An apparatus as in claim 19, wherein the capacitor is capable of withstanding at least 1000 V.

25. An apparatus as in claim 19, wherein the power source includes a signal generator configured to generate the driving signal, the signal generator having an impedance based on a resistance of the antenna at resonance to maximize the amount of power transferred from the antenna to the receiver.

26. An apparatus as in claim 19, wherein the antenna has a substantially round outer form factor.

27. An apparatus as in claim 19, wherein the antenna has a substantially rectangular outer form factor.

28. An apparatus as in claim 19, wherein the inductive component is connected to the power source and is configured to receive the driving signal, and wherein the resonant component is physically separated from the inductive component.

29. An apparatus as in claim 19, wherein the inductive component and the resonant component have different outer form factors.

30. An apparatus as in claim 19, wherein the inductive component and the resonant component have substantially the same outer form factors.

31. A system as in claim 19, wherein the capacitor is a variable capacitor.

32. The apparatus of claim 19, wherein the antenna has a Q value of approximately 700.

33. The apparatus of claim 19, wherein the antenna has a Q value of approximately 450.

34. The apparatus of claim 19, wherein the antenna has a Q value of approximately 100.

35. The apparatus of claim 19, wherein the antenna is prevented from being located at greater than a maximum distance from the receiver, wherein at a second distance greater than the maximum distance a power received by the receiver falls below the usable range.

36. A system of transferring energy wirelessly, comprising:
  multidirectional antenna having a usable range at a resonant frequency and having a higher Q factor than a receiver;
  a power source coupled to the antenna, the power source configured to drive the antenna using a driving signal having a frequency within a range of the resonant frequency to generate a magnetic field in more than one direction,
  the antenna including at least a first resonant component including a wire loop in series with a capacitor, and a first inductive component including an inductive coil, the first inductive component being physically separated from the first resonant component, and
  the receiver configured to receive power via the magnetic field and charge a load coupled to the receiver, the receiver including a second resonant component including a wire loop and a capacitor, and a second inductive component including an inductive loop; and
  a frame coupled to the antenna, the frame configured to prevent the antenna from being located at less than a minimum distance from the receiver, the minimum distance equal to a distance at or above which detuning of the antenna by the receiver is reduced.

37. A system as in claim 36, wherein the first resonant component comprises a material that is separate from a material of the first inductive component.

38. A system as in claim 36, wherein the first inductive component and the first resonant component have different outer form factors.

39. A system as in claim 36, wherein the first inductive component and the first resonant component have different outer sizes.

40. A system as in claim 36, wherein the first inductive component and the first resonant component have substantially the same outer form factors.

41. A system as in claim 36, wherein the receiver is resonant at the resonant frequency, and wherein the receiver includes a rectifier configured to output electrical power to the load.

42. A system as in claim 36, wherein the minimum distance is between 2 and 12 inches.

43. A system as in claim 36, wherein the resonant frequency is set to a value of approximately 13.56 MHz.

44. A system as in claim 36, wherein the capacitor is capable of withstanding at least 1000 V.

45. A system as in claim 36, wherein the power source includes a signal generator configured to generate the driving signal, and wherein the signal generator has an impedance based on a resistance of the antenna at resonance to maximize the amount of power transferred from the antenna to the receiver.

46. A system as in claim 36, wherein the antenna has a substantially round outer form factor.

47. A system as in claim 36, wherein the antenna has a substantially rectangular outer form factor.

48. An apparatus for receiving power via a wireless field comprising:
an antenna having a usable range at a resonant frequency and configured to receive power via a magnetic field generated in more than one direction by a transmitter having a multidirectional antenna; and
a circuit configured to receive power from the antenna at a frequency within a range of the resonant frequency to generate a power output from the received power, the power output configured to charge a load coupled to the receive circuit,
the antenna having a lower Q factor than the transmitter antenna and formed of a combination of components, including at least a resonant component including a wire loop in series with a capacitor, and an inductive component including an inductive coil, the inductive component physically separated from the resonant component; and
a frame coupled to the antenna, the frame configured to prevent the antenna from being located at less than a minimum distance from the transmitter, the minimum distance equal to a distance at or above which detuning of the antenna by the transmitter is reduced.

49. An apparatus as in claim 48, wherein the resonant component is formed of a material that is separate from a material forming the inductive component.

50. An apparatus as in claim 48, wherein the inductive component and the resonant component have different outer form factors.

51. An apparatus as in claim 48, wherein the inductive component and the resonant component have different outer sizes.

52. An apparatus as in claim 48, wherein the inductive component and the resonant component have substantially the same outer form factors.

53. An apparatus as in claim 48, wherein the circuit includes a rectifier configured to output electrical power to the load.

54. An apparatus as in claim 48, wherein the minimum distance is between 2 and 12 inches.

55. An apparatus as in claim 48, wherein the resonant frequency is set to a value of approximately 13.56 MHz.

56. An apparatus as in claim 48, wherein the capacitor component is capable of withstanding at least 1000 V.

57. An apparatus as in claim 48, wherein the antenna has a substantially round outer form factor.

58. An apparatus as in claim 48, wherein the antenna has a substantially rectangular outer form factor.

59. A method of receiving power via a wireless field, comprising:
receiving power via a magnetic field generated in more than one direction by a transmitter having a multidirectional antenna with a series resonant antenna having a usable range at a resonant frequency and having a lower Q factor than the transmitter antenna, the resonant antenna including a resonant component and an inductive component;
transferring the received power from the resonant component to the inductive component;
converting the transferred power to electrical power with a receiving circuit, the receiving circuit interacting with the inductive component at a frequency within a range of the resonant frequency to generate a power output from the transferred power, the power output configured to charge a load,
the resonant component including a wire loop in series with a capacitor, and the inductive component including an inductive coil; and
preventing the antenna from being located at less than a minimum distance from the transmitter, the minimum distance defining a distance at or above which detuning of the antenna by the transmitter is reduced.

60. A method as in claim 59, wherein the minimum distance is between 2 and 12 inches.

61. A method as in claim 59, wherein the resonant frequency is set to a value of approximately 13.56 MHz.

62. An apparatus for transmitting power wirelessly, comprising:
means for driving multidirectional antenna with a driving signal at a frequency within a range of the resonant frequency of the antenna to generate a magnetic field in more than one direction, the magnetic field configured to wirelessly transfer power to a receiver for charging a load coupled to the receiver, said antenna located at a minimum distance from the receiver and having a greater Q factor than the receiver, the minimum distance equal to a distance at or above which detuning of the antenna by the receiver is reduced, the antenna including at least means for resonating including a wire loop in series with a capacitor, and means for inducting; and
means for preventing the antenna from being located at less than the minimum distance from the receiver.

63. An apparatus for wirelessly receiving power, comprising:
means for receiving power via a magnetic field with a series resonant antenna having a usable range at a resonant frequency and having a lower Q factor than a transmitter generating the magnetic field in more than one direction, the resonant antenna including a means for resonating and means for inducting;
means for transferring the received power from the means for resonating to the means for inducting;
means for converting the transferred power to electrical power, the means for converting configured to interact with the means for inducting at a frequency within a range of the resonant frequency to generate a power output from the transferred power, the power output configured to charge a load coupled to the means for receiving power,
the means for resonating including a wire loop in series with a capacitor, and the means for inducting including an inductive coil; and
means for preventing the antenna from being located at less than a minimum distance from the transmitter having a multidirectional antenna, the minimum distance equal to a distance at or above which detuning of the antenna by the transmitter is reduced.

64. An antenna comprising:
a first loop of conductive material;
a first tuning part coupled to the first loop;
a second loop of conductive material, the second loop configured to encompass the first loop and being unconnected to the first loop; and a second tuning part coupled in series to the second loop, the first tuning part and the second tuning part configured to adjust a characteristic of the antenna, the antenna configured to be located at or greater than a minimum distance from another antenna, the minimum distance equal to a distance at or above which detuning of the antenna by the other antenna is reduced, and further configured to generate a magnetic field in more than one direction, configured to wirelessly transfer power to the other antenna for charging a load coupled to the other antenna.

65. The antenna of claim 64, wherein the first tuning part and the second tuning part include variable capacitors.

66. A method of transmitting power via a magnetic field, the method comprising:

driving a multidirectional antenna having a higher Q factor than a receiver with a driving signal at a frequency within a range of the resonant frequency of the antenna to generate the magnetic field in more than one direction, the magnetic field configured to wirelessly transfer power to the receiver for charging a load coupled to the receiver, the antenna including a first loop of conductive material, a first tuning part coupled to the first loop, a second loop of conductive material, the second loop configured to encompass the first loop and being unconnected to the first loop, and a second tuning part coupled in series to the second loop; and preventing the antenna from being located at less than a minimum distance from the receiver, the minimum distance defining a distance at or above which detuning of the antenna by the receiver is reduced.

67. A method of receiving power via a magnetic field, the method comprising:

receiving power transmitted by a transmitter having a multidirectional antenna via the magnetic field generated in more than one direction with an antenna having a lower Q factor than the transmitter antenna;

converting the received power to electrical power for charging a load coupled to the antenna, the antenna including a first loop of conductive material, a first tuning part coupled to the first loop, a second loop of conductive material, the second loop configured to encompass the first loop and being unconnected to the first loop, and a second tuning part coupled in series to the second loop; and preventing the antenna from being located at less than a minimum distance from the transmitter, the minimum distance defining a distance at or above which detuning of the antenna by the transmitter is reduced.

68. An antenna comprising:

a first loop of conductive material;

first means for tuning coupled to the first loop;

a second loop of conductive material, the second loop configured to encompass the first loop and being unconnected to the first loop; and second means for tuning coupled in series to the second loop, the first means for tuning and the second means for tuning configured to adjust a characteristic of the antenna, the antenna configured to be located at or greater than a minimum distance from another multidirectional antenna, the minimum distance equal to a distance at or above which detuning of the antenna by the other antenna is reduced, and further configured to receive a magnetic field generated in more than one direction and configured to wirelessly transfer power to the antenna for charging a load, the second loop having a lower Q factor than the other antenna.

\* \* \* \* \*